United States Patent
Farkas et al.

(10) Patent No.: US 8,174,992 B2
(45) Date of Patent: May 8, 2012

(54) FAULT LOCALISATION IN MULTIPLE SPANNING TREE BASED ARCHITECTURES

(75) Inventors: Janos Farkas, Kecskemét (HU); Wei Zhao, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/525,713

(22) PCT Filed: Feb. 8, 2007

(86) PCT No.: PCT/EP2007/051219
§ 371 (c)(1),
(2), (4) Date: Mar. 12, 2010

(87) PCT Pub. No.: WO2008/095538
PCT Pub. Date: Aug. 14, 2008

(65) Prior Publication Data
US 2010/0177641 A1    Jul. 15, 2010

(51) Int. Cl.
*H04L 12/26* (2006.01)

(52) U.S. Cl. .................. 370/242; 370/216; 370/256

(58) Field of Classification Search .......... 370/216, 370/231, 237, 241, 242, 248, 252, 254, 256
See application file for complete search history.

(56) References Cited

U.S. PATENT DOCUMENTS

| | | | | |
|---|---|---|---|---|
| 5,805,578 | A * | 9/1998 | Stirpe et al. | 370/255 |
| 7,397,789 | B2 * | 7/2008 | Chari et al. | 370/351 |
| 7,693,072 | B2 * | 4/2010 | Chiang et al. | 370/238 |
| 2004/0160904 | A1 | 8/2004 | Enomoto et al. | |

FOREIGN PATENT DOCUMENTS

WO   WO 2006/135282 A   12/2006

OTHER PUBLICATIONS

Demoracski L: "Fault-Tolerant Beacon Vector Routing for Mobile Ad Hoc Networks" Parallel and Distributed Processing Symposium, 2005. Proceedings. 19$^{th}$ IEEE International Denver, CO, USA Apr. 4-8, 2005, Piscataway, NJ, USA, IEEE, Apr. 4, 2005, pp. 279b-279b.
Farkas J, Antal C, Westbert L, Paradisi A et al: "Fast Failure Handling in Ethernet Networks" IEEE Communications Society [Online] Jun. 13, 2006, pp. 841-846.
Farkas J, et al: "Distributed resilient architecture for Ethernet networks" Design of Reliable Communication Networks, 2005. (DCRN 2005). Proceedings. 5$^{th}$ International Workshop on Island of Ischia, Italy Oct. 16-19, 2005, Piscataway, NJ, USA, IEEE, Oct. 16, 2005, pp. 515-522.

* cited by examiner

*Primary Examiner* — Brenda H Pham

(57) ABSTRACT

A method of localizing a fault in a network is disclosed. The network comprises nodes (SW1 . . . SW4) links, and edge-nodes (EN1 . . . EN4) arranged as a plurality of spanning trees (T1, T2,T3), the spanning trees being partially disjoint. The network further comprises means for network management. The method comprising the steps of receiving information on the configuration of the plurality of tree topologies in the network; monitoring connectivity in the network; upon detection of a loss of connectivity in the network, identifying the failed tree(s), and determining the network elements common to the failed tree(s).

10 Claims, 3 Drawing Sheets

FAULT LOCALISATION IN MULTIPLE SPANNING TREE BASED ARCHITECTURES

TECHNICAL FIELD

The present invention relates to a method for fault localisation in networks. In particular it relates to a method for localising faults in multiple spanning tree based architectures.

BACKGROUND

For the Ethernet access network to be able to deliver carrier-grade services, fast failure detection and failover time are becoming more and more important. After a failure is detected and data switched to alternative paths, there needs to be a mechanism to localize the failure in the network and then fix it.

Simple Network Management Protocol (SNMP), RFC1157, provides the trap mechanism for managed network elements to raise alarms to a management system when a failure occurs. SNMP traps are pre-defined events, among which for instance "link down" is one of the most common events defined by RFC1157 and supported by all vendors. When a link failure occurs, the managed network device associated with this link will issue a notification event to the management system. Upon receiving the event, the management system may choose to take some actions based on the event, for instance fixing the link failure, etc.

A newer approach specified by IEEE 802.1ag ("Draft Standard for Local and Metropolitan Area Networks—Virtual Bridged Local Area Networks—Amendment 5: Connectivity Fault Management", IEEE 802.1ag, 2005) attempts to address the failure management, including failure localization, from layer 2. It provides both an architecture and working messages which are Layer-2 correspondence to IP Ping and TraceRoute. The essence of the 802.1ag architecture is in the nested management domains and the designation of maintenance endpoints and maintenance intermediate points. The nested architecture provides both an end-to-end view of the whole network along the service provisioning path and detailed responsible player of each hop of the network. Hence, when a link failure occurs, it is easy to address the failure on a layer-by-layer basis and reach the level where responsibility lies and actions have to be taken. Aside from the architecture itself, 802.1ag also defines four messages for information exchange and failure locating:

Continuity Check Messages:
These are "heartbeat" messages issued periodically by maintenance endpoints. They allow maintenance endpoints to detect loss of service connectivity among themselves. They also allow maintenance endpoints to discover other maintenance endpoints within a domain, and allow maintenance intermediate points to discover maintenance endpoints.

Link Trace Messages:
These are transmitted by a maintenance endpoint upon request of the administrator to track the path (hop by hop) to a destination maintenance endpoint. They allow the transmitting node to discover vital connectivity data about the path. It is similar in concept to IP Traceroute.

Loopback Messages:
These are transmitted by a maintenance endpoint upon request of the administrator to verify connectivity to a particular maintenance intermediate point or maintenance endpoint. Loopback indicates whether the target maintenance point is reachable or not; it does not allow hop-by-hop discovery of the path. It is similar in concept to ICMP Echo (Ping).

AIS Messages:
These provide asynchronous notification to other elements in the network that there is a fault in the metro Ethernet network. AIS is typically used to suppress alarms at network elements other than the ones that directly detect the fault.

In networks where nodes are interconnected via multiple paths the Spanning-Tree Protocol (STP) can prevent loops from being formed. This ensures that there is only one active path between any two network devices. The totality of active paths forms a so-called spanning tree. The Multiple Spanning Tree Protocol (MSTP) allows several VLANs to be mapped to a reduced number of spanning-trees. This is possible since most networks do not require more than a few logical topologies. Each tree can handle multiple VLANs that have the same topology. On this basis, a number of multiple spanning tree based fault tolerant architectures have been proposed.

As described by S. Sharama, K. Gopalan, S. Nanda, and T. Chiueh in "Viking: A multi-spanning-tree Ethernet architecture for metropolitan area and cluster networks", IEEE INFOCOM 2004, the Viking architecture uses multiple spanning trees that are reconfigured after a failure event. The Viking Manager (VM) is notified via SNMP traps if a failure happens. VM then notifies the edge-nodes of the network that they have to redirect traffic to unharmed trees and initiates the recalculation and reconfiguration of the trees.

In contrast the low-cost resilient Ethernet concept is based on static spanning trees that are configured before network operation and do not change despite of failure occurrences (J. Farkas, C. Antal, G. Toth and L. Westberg, "Distributed Resilient Architecture for Ethernet Networks", Proceedings of Design of Reliable Communication Networks, 16-19 Oct. 2005, pp. 512-522; J. Farkas, C. Antal, L. Westberg, A. Paradisi, T. R. Tronco and V. G. Oliveira, "Fast Failure Handling in Ethernet Networks", Proceedings of IEEE International Conference on Communications, 11-15 Jun. 2006; J. Farkas, A. Paradisi, and C. Antal, "Low-cost survivable Ethernet architecture over fiber", J. Opt. Netw. 5, pp. 398-409, 2006). In this architecture, failure detection and fault handling is implemented in a distributed manner in the edge-nodes. This architecture consists of low-cost off-the-shelf standard Ethernet switches available on the market; any solutions relying on new functionality in the Ethernet switches are excluded in order to keep the price advantage of current Ethernet products. The extra functionalities that are needed for providing resiliency are implemented as a software protocol at the edge-nodes of the Ethernet network.

FIG. 2 shows an example for such architecture. Predefined multiple spanning trees are statically set-up across the network to serve as either primary or alternative paths that can be used to route traffic in the network, thus able to handle possible failures. To achieve protection against any single link or node failure, the topology of the spanning trees must be such that there remains at least one complete functional tree in the event of failure of any single network element. Therefore the spanning trees have to be partially disjoint, i.e. they must comprise different network elements, they cannot be identical. For instance, spanning trees can be calculated. Multiple failures can be handled with more trees; it is a matter of tree design. The spanning trees are set-up before network start-up, remaining unchanged during operation, even in the presence of a failure.

In the event of a failure, each edge-node must stop forwarding frames to the affected trees and redirect traffic to unharmed trees. Therefore, a protocol is needed for failure detection and for notifying all the edge-nodes about the broken trees. Failover time mainly depends on the time elapsed between the failure event and its detection by the edge-nodes because protection switching from a tree to another is done without any re-configuration of the Ethernet switches.

The Failure Handling Protocol (FHP) is a simple and lightweight distributed protocol implemented in the edge-nodes that relies on few broadcast messages to provide fast protection against a single link or node failure occurred in the network.

The protocol basically defines three types of broadcast messages:
  Alive: message sent out periodically by one or more edge-nodes referred to as emitter over each VLAN according to a predefined time interval $T_{Alive}$;
  Failure: message issued by an edge-node named notifier when an Alive message does not arrive over a VLAN within a pre-defined detection interval $T_{DI}$, to inform all the other edge-nodes of a failure in that VLAN;
  Repaired: message issued by the same notifier that detected a failure when an Alive message arrives over a previously failed VLAN to inform all the other edge-nodes about the reparation of the failed VLAN.

Two types of notifiers are distinguished based on their timer settings: primary and secondary. Few notifiers are configured as primary; all the others that are neither emitters nor primary-notifiers are called secondary-notifiers. The reason of differentiating primary and secondary-notifiers is to reduce the number of concurrent notification messages during a failure event, as detailed below.

As shown in FIG. 3, Alive messages are broadcasted periodically by the emitter edge-node over each VLAN at the beginning of $T_{Alive}$ time interval. The requirement is that Alive messages are received on all VLANs at each other edge-node (notifier) within the predefined $T_{DI}$ time interval. As the transmission delay is, in general, different for each notifier and protocol time intervals are short, the synchronization of notifiers with respect to the emitter has key importance. Therefore, each notifier starts a timer when the first Alive message has arrived in order to measure when $T_{DI}$ has elapsed, i.e. the first received Alive message synchronizes the notifier to the emitter. Thus, the effect of the difference in transmission delay among different notifiers has been eliminated. Subsequent Alive messages suffer somewhat different delay as they travel different path, which has to be taken into account during the configuration of $T_{DI}$. The arrival of all Alive messages is registered in each notifier edge-node. If there are Alive messages that have not arrived within $T_{DI}$, then the corresponding VLANs are considered down. That is, the loss of a single Alive message is interpreted as the breakdown of a VLAN. However, to avoid false alarms due to an Alive frame drop, notifiers can be configured to wait two or three subsequent Alive periods and mark a VLAN broken only if Alive message is consistently missing in each period.

All edge-nodes, except the emitter, supervise the reception of Alive messages. However, to avoid excessive protocol load after a failure, there are only a few primary-notifier edge-nodes whose task is to notify other edge-nodes about the failure. The detection interval of primary-notifiers is shorter than that of secondary-notifiers, and it can be adjusted depending on the network size and other parameters. When a notifier edge-node detects a failure, it broadcasts a Failure message over each operating VLAN that is considered unharmed, which contains the IDs of the broken VLANs. As each edge-node receives the Failure messages, all of them become aware of the failed VLANs.

As the number of primary-notifiers is intentionally limited, some failures might be undetected depending on the network topology. Therefore, if a secondary-notifier detects a failure based on the missing arrival of an Alive message, then this node broadcasts the Failure message to inform all the other edge-nodes of the failure in the same way as described above.

SNMP and CFM based approaches have their limitations. For instance, SNMP is dependent on the proper functioning of IP, which is not always valid in layer-2 Ethernet access environment. SNMP traps can be used for fault localization as proposed for instance in the Viking architecture discussed above. However, there may be network nodes that are not able to send SNMP traps, e.g. non-manageable nodes, not configured or misconfigured nodes. In this case, fault localization cannot be solved by SNMP traps. 802.1ag is a relatively new standard and the mechanism specified is complex, and its effectiveness has not yet been proven. However, both SNMP and CFM based approaches have one problem in common: they lack the proper failover mechanism. Both solutions can identify when and where a link failure occurs, but neither of them has a complete solution as for how to lead the network to walk around the failure.

SUMMARY

It is an object of the present invention to obviate at least some of the above disadvantages and provide an improved method of localising a fault in a network.

According to a first aspect of the present invention, there is provided a method of localising a fault in a network. The network comprises nodes, links, and edge-nodes configured as a plurality of spanning trees. The spanning trees are partially disjoint. The method comprises receiving information on the configuration of the plurality of tree topologies in the network and monitoring connectivity in the network. Upon detection of a loss of connectivity in the network, the failed tree(s) are identified and the network elements common to the failed tree(s) are determined.

In a first configuration of the above aspect, network elements which are part of non-failed trees may be determined and excluded.

In another configuration of the above aspect the remaining network elements may be checked for a fault.

In a further configuration of the above aspect the step of monitoring connectivity in the network may further comprise monitoring for a notification of loss of connectivity in one or more trees.

In yet another configuration of the above aspect said notification may comprise an identification of the failed tree.

In a further configuration of the above aspect, said notification may further comprise path information from a broadcasting edge-node to a failure-reporting edge-node.

In another configuration of the above aspect point-to-point connectivity monitoring may be applied and said notification may further comprise information relating to which point-to-point connections have failed.

In yet a further configuration of the above aspect path information is retrieved by Link Trace messages.

According to a second aspect of the present invention, there is provided a method of notifying loss of connectivity in a network. The network comprises nodes, links, and edge-nodes arranged as a plurality of spanning trees, the spanning trees being partially disjoint, the network further comprising means for network management. The method comprises monitoring for Alive messages broadcast by another edge-node. Upon detection of a missing Alive message, network management is notified of a loss of connectivity.

In a first configuration of the above aspect the step of notifying network management may comprise sending identification of the failed tree(s).

In another configuration of the above aspect said notification may further comprise path information from the broadcasting edge-node to the failure-reporting edge-node.

In a further configuration of the above aspect, upon detecting loss of connectivity in a tree, edge-nodes may redirect traffic to trees not affected by the loss of connectivity.

According to a third aspect of the present invention, there is provided a network management adapted to operate according to the first aspect or any of its configurations.

In a configuration of the third aspect the network management comprises a server.

According to a fourth aspect of the present invention there is provided an edge node adapted to operate according to the second aspect or any of its configurations.

The present invention may provide efficient fault localization where multiple logical tree topologies are used. Moreover, it does not introduce extra overhead to the fault handling roles of edge-nodes.

DETAILED DESCRIPTION

Figure 1:
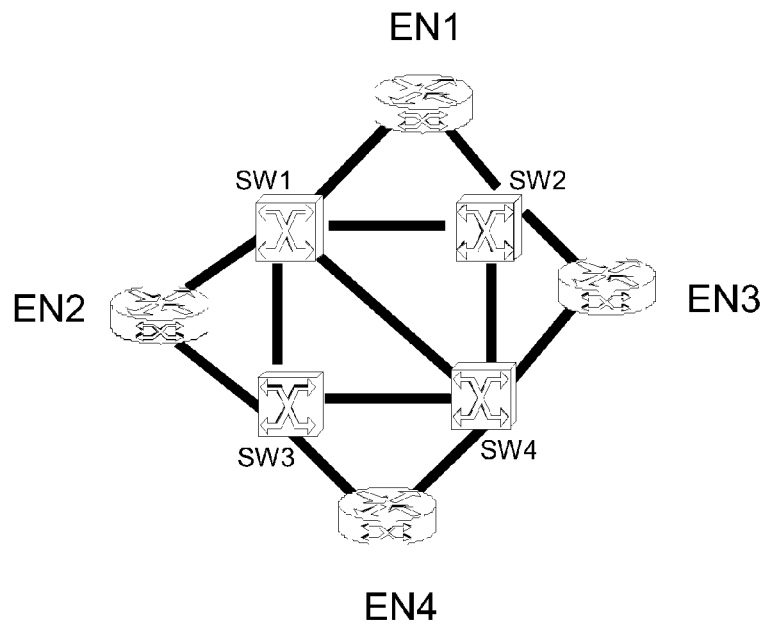
FIG. 1 illustrates an example of a physical topology.

A multiple spanning tree based network architecture is described in detail in J. Farkas, C. Antal, G. Toth, L. Westberg, above; J. Farkas, C. Antal, L. Westberg, A. Paradisi, T. R. Tronco, V. G. Oliveira, above; and J. Farkas, A. Paradisi, and C. Antal, above. Accordingly logical tree topologies are implemented in the network in order to provide resilience. The trees are not completely, but partially disjoint in order to avoid significant management complexity caused by the trees. The method according to the present invention works independently of the design of tree topologies.

The underlying architecture consists of internal nodes and Edge-Nodes (EN) and the interconnecting links. Internal nodes may be off-the-self equipments without any special functionality related to the architecture. By contrast, edge-nodes implement the Failure Handling Method (FHM) described above. According to this method, a so-called Alive message is broadcast on every tree and the arrival of these messages is monitored in the edge-nodes. Based on missing Alive messages breakdown (or loss of connectivity) of trees can be detected and edge-nodes may redirect traffic to unharmed trees. Restoration may also be solved based on newly appeared Alive messages on formerly broken trees.

Other connectivity monitoring methods may be also applied e.g. CFM or BFD, which are point-to-point monitoring methods. It is required that all trees have to be monitored in between each edge-node pairs and failure has to be reported to management system. Then the fault localization method described in the present invention can be applied.

Assuming that the above described fault handling method is applied in the network the location of the fault can be determined. As a Failure message containing the ID of the broken logical topologies (trees) is broadcast after the fault each edge-node is aware of the broken trees, which can be propagated to the management system that calculated and configured the trees. Each tree is a set of nodes and links. The broken element is in the intersection of the broken trees, which can be a single node or link or very few nodes or links. Accordingly the location of the fault is one of the network elements in the intersection of the broken trees.

The set of broken elements may be restricted even further because the management system also knows that each node and link of the operational trees that survived the failure are also operating. Therefore a smaller set of possibly broken elements may be obtained if all those links and nodes are subtracted which are part of any of the operating trees from the intersection of the broken trees.

A further refinement may be that during the multiple trees generation, in each edge-node, aside from the tree ID, the path information from the emitter to the edge-node is also stored. When a link or node failure occurs, the edge-node sends out a failure message with both the tree ID and the path information. Thus the possible fault can be further narrowed down to one path of a tree or several paths of multiple trees. Fault tolerant spanning trees are calculated off-line and configured before network start-up and remain static during network operation. Path information towards the emitter can be stored in each edge-node during this configuration phase. Another possibility to retrieve path information may be with the help of Link trace messages if IEEE 802.1ag is applied in the network.

Figure 4:
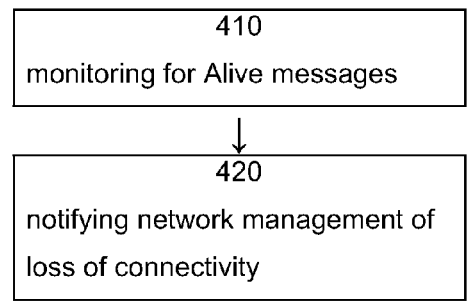
FIG. 4 shows a flow-chart of notifying a fault in a network in accordance with the present invention.

As shown in FIG. 4 faults are handled by edge-nodes as described briefly in the previous section. In step 410, edge-nodes are monitoring for missing Alive messages. Edge-nodes are aware of the broken and unharmed tree topologies and may direct traffic to available trees that provide connectivity in the network. If the path information is stored, the edge-node will also be aware of its path to the emitter.

As edge-nodes are aware of which logical topologies are broken, they are able to notify the network management (NM) about the broken topologies in step 420. If path information is also stored then edge-nodes also inform NM about the broken path(s) of the tree(s). Network management is aware of all logical topologies in the network, since the network had been configured by the network management before. Therefore, possibly broken network elements can be determined based on this information, as follows:

Only those links or nodes could be broken which are included in all broken logical topologies.

Figure 5:
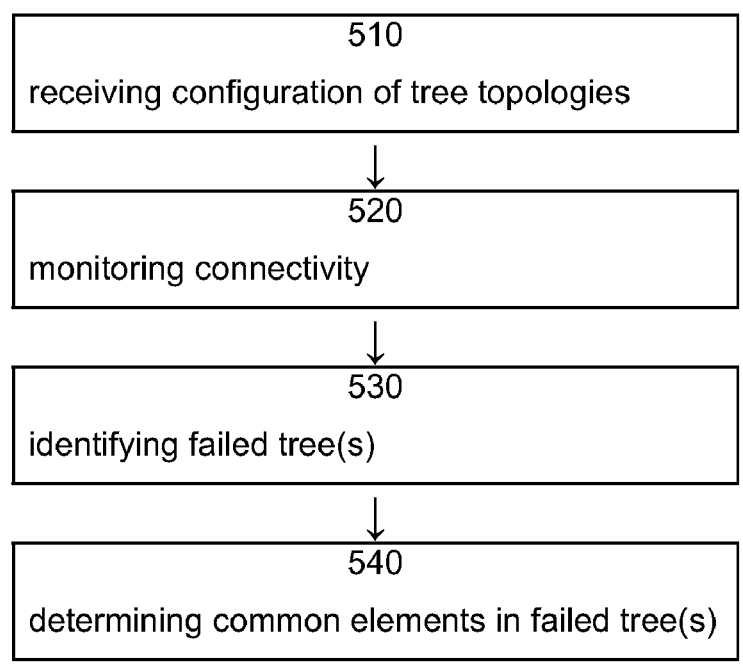
FIG. 5 shows a flow-chart of localising a fault in a network in accordance with the present invention.

With reference to FIG. 5, the fault localization method according to the present invention operates the following way:

In step 510 network management receives information about the configuration of the tree topologies configured in the network.

In step 520 connectivity in the network is monitored.

In step 530 network management is informed about the trees that are broken in case of a failure event. This information may be received from edge nodes. If path information is also available then the information about failed or broken path(s) may also be sent to Network Management.

In step 540, common network element(s) of all damaged trees are determined.

Additionally those elements which are part of unaffected trees may be excluded from the set of possibly faulty elements.

Furthermore, the information on which edge-node reported the failure and which edge-node is the one that broadcasts the Alive messages may also be taken into account: common network element(s) on damaged trees in the path between broadcaster and fault reporter nodes. If point-to-point connectivity monitoring is applied, e.g. CFM, then it is also useful information for fault localisation that edge-nodes report the path between which edge-node pairs are broken. If path information on broken path(s) is also available then it may also be used to determine the broken element(s).

The network elements thus identified as possibly faulty may be checked.

Fault localization according to the present invention is illustrated in the following example network, the physical topology of which is shown in FIG. 1. The example network consists of four internal nodes SW1, SW2, SW3 and SW4, four edge-nodes EN1, EN2, EN3 and EN4, and nine links interconnecting these nodes.

Figure 2:
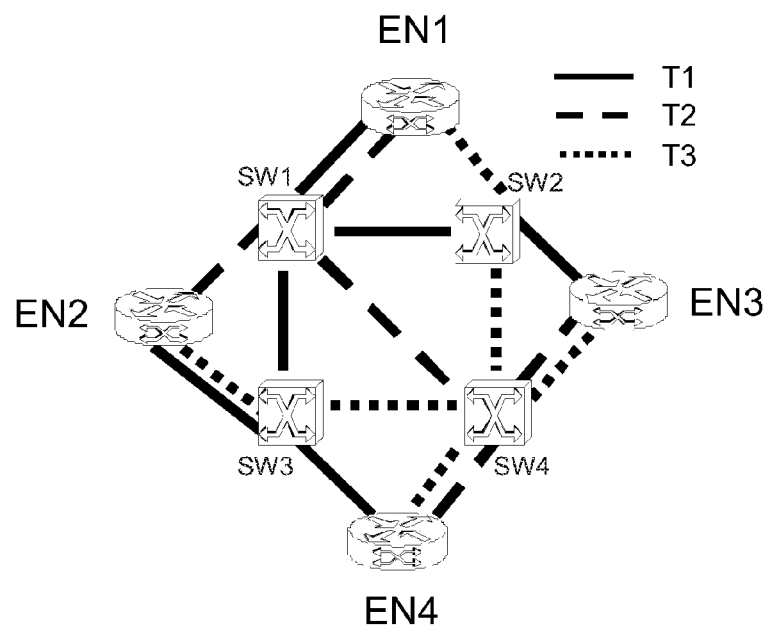
FIG. 2 illustrates an example of logical topologies.
Figure 3:
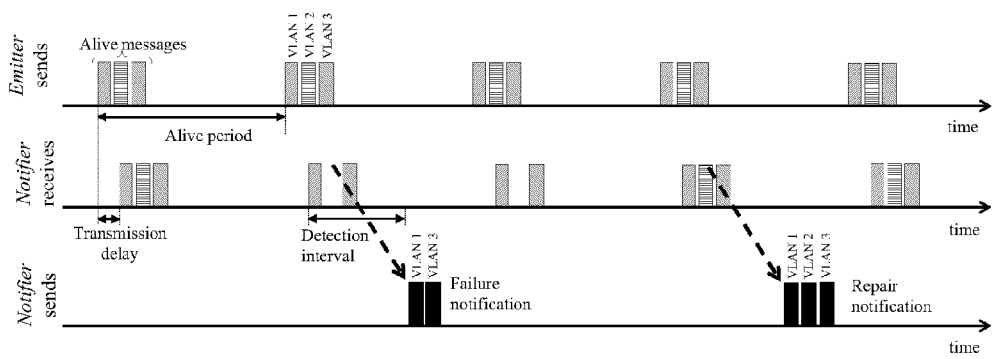
FIG. 3 shows a schematic time-sequence chart of the protocol messages and node roles.

With reference to FIG. 2, a multiple spanning tree based network architecture is assumed, as described in detail in J. Farkas, C. Antal, G. Toth, L. Westberg, above; J. Farkas, C. Antal, L. Westberg, A. Paradisi, T. R. Tronco, V. G. Oliveira, above; and J. Farkas, A. Paradisi, and C. Antal, above. Tree topologies are determined accordingly in order to handle single failures as depicted in FIG. 2, which illustrates an example of the logical topologies underlying the present invention. Three trees (T1, T2, and T3) are needed to handle all possible single failures in this exemplary network. The network and its elements are identical to the representation in FIG. 1.

If a failure occurs, then at least one of the trees will go down.

For instance, if one of the edge-nodes informs the network management that tree T2 went down (and assuming that only this tree is broken, i.e. no failure report received on other trees) then network management concludes that only an element of tree T2 may be at fault: EN1, SW1, EN2, SW4, EN4, EN3 and the respective links therebetween.

Eliminating further those elements of tree T2 which are also part of unaffected trees T1 and T3, the set of possibly faulty elements may be further limited to the link between node SW1 and node SW4 and/or the link between edge-node EN2 and node SW1.

Applying the Fault Handling Method (FHM) roles of edge-nodes, the place of the fault may be determined even more accurately. If edge-node EN1 broadcasts the Alive messages and edge-node EN2 reports the failure, then it follows that the link between edge-node EN2 and node SW1 went down.

This fault may also be located based on path information if this information is also implemented in the network and included in failure messages. Then the failure message is notified to the management system together with the following path information: EN2-SW1-EN1. Node SW1, edge-node EN1 and the link between these two nodes are also part of tree T1, and it is known that tree T1 is alive. It therefore follows that either EN2 or the link between EN2 and node SW1 is broken.

Using the same method, it follows that if edge-node EN3 or edge-node EN4 reports the failure, then the link between node SW1 and node SW4 is the broken one.

A more complex case arises if only tree T2 survives a failure, i.e. both tree T1 and tree T3 are broken. In this case, either node SW2 or node SW3 or the link between edge-node EN2 and node SW3 may be broken, but it is not possible to identify the precise network element causing the fault.

The most difficult situation may arise when edge-node EN2 broadcasts the Alive messages. If any other edge-node broadcasts the Alive message, then the place of the fault can be located based on which edge-node(s) report the failure.

Nonetheless, if edge-node EN2 broadcasts the Alive messages then it is easy to find out when node SW2 is broken, because in that case edge-node EN1 reports the breakdown of tree T3 and edge-node EN3 reports the breakdown of tree T1. On the other hand, it is not possible to determine whether the node SW3 or only the link between SW3 and EN2 is broken because all other edge-nodes report failure of both tree T1 and tree T3 in this case, but Network Management may check whether node SW3 is available. That is, the exact network element may not be found in this case, but the place of the failure is determined.

All other broken network elements can be determined based on the information of the broken trees and the reporter(s) of the failure(s) and the broadcasting edge-node in this example. In larger networks the set of possibly broken network elements can be limited to a few using this method.

The proposed method takes a further step based on the Fault Handling Method (FHM) roles of edge-nodes and together with it can provide a complete solution for fast fail over and fault detection. It does not introduce extra overhead to FHM roles of edge-nodes, thus inheriting all advantages, such as light weight, speed, and efficiency.

The proposed method is simple and can be efficiently applied for fault localization where multiple logical tree topologies are used for traffic forwarding and the availability of these topologies is monitored. Thus the proposed method can be easily applied in a low-cost architecture that only provides basic features. Furthermore, the proposed method can be also applied in networks consisting of nodes providing enhanced features like IEEE 802.1ag.

Another possible benefit the proposal can bring is that the calculation performed by the management system for fault localization purpose can give statistical hints on link usage and possible bottleneck of the network, which can be very useful for network resource allocation and optimization.

The invention claimed is:

1. A method of localizing a fault in a telecommunication network, wherein the telecommunication network comprising a network management node, a switching nodes, links, and edge-nodes configured as a plurality of spanning trees, the spanning trees being partially disjoint; wherein the network management node comprising a processor, and an associated memory storing instruction, the method comprising steps of:
    receiving information on the configuration of the plurality of tree topologies in the network;
    monitoring connectivity in the network;
    upon detection of a loss of connectivity in the network, identifying the failed tree(s); and
    determining the network elements common to the failed tree(s).

2. The method according to claim 1, further comprising determining and excluding network elements which are part of non-failed trees.

3. The method according to claim 1, further comprising the step of checking the remaining network elements for a fault.

4. The method according to claim 1, wherein the step of monitoring connectivity in the network further comprises monitoring for a notification of loss of connectivity in one or more trees.

5. The method according to claim 4, wherein said notification comprises an identification of the failed tree.

6. The method according to claim 5, wherein said notification further comprises path information from a broadcasting edge-node to a failure-reporting edge-node.

7. The method according to claim 5, wherein point-to-point connectivity monitoring is applied and said notification further comprises information relating to which point-to-point connections have failed.

8. The method according to claim 5, wherein path information is retrieved by Link Trace messages.

9. A network management node for localizing a fault in a telecommunication network, the telecommunication network comprising switching nodes, links, and edge-nodes configured as a plurality of spanning trees, the spanning trees being partially disjoint; the network management node comprising:
 a receiver means for receiving information on the configuration of the plurality of tree topologies in the network;
 monitoring means for monitoring connectivity in the network;
 detector means wherein upon detection of a loss of connectivity in the network, identifying failed tree(s); and
 a processor and associated memory storing instructions for determining the network elements common to the failed tree(s).

10. The network management node according to claim 9, wherein the network management node comprises a server.

* * * * *

UNITED STATES PATENT AND TRADEMARK OFFICE
CERTIFICATE OF CORRECTION

| | | |
|---|---|---|
| PATENT NO. | : 8,174,992 B2 | Page 1 of 1 |
| APPLICATION NO. | : 12/525713 | |
| DATED | : May 8, 2012 | |
| INVENTOR(S) | : Farkas et al. | |

It is certified that error appears in the above-identified patent and that said Letters Patent is hereby corrected as shown below:

In Column 8, Line 41, in Claim 1, delete "a switching" and insert -- switching --, therefor.

Signed and Sealed this
Ninth Day of October, 2012

David J. Kappos
*Director of the United States Patent and Trademark Office*